April 9, 1957 A. O. LUND 2,788,089
MOTOR CONTROL CIRCUIT FOR USE IN ELEVATOR SYSTEMS
Filed June 21, 1954 2 Sheets-Sheet 1

April 9, 1957 A. O. LUND 2,788,089
MOTOR CONTROL CIRCUIT FOR USE IN ELEVATOR SYSTEMS
Filed June 21, 1954 2 Sheets-Sheet 2

WITNESSES
Edwin E. Bassler
John B. Davidson

INVENTOR
Alvin O. Lund
BY
Paul E. Friedemann
ATTORNEY

United States Patent Office 2,788,089
Patented Apr. 9, 1957

2,788,089

MOTOR CONTROL CIRCUIT FOR USE IN ELEVATOR SYSTEMS

Alvin O. Lund, Great Notch, N. J., assignor to Westinghouse Electric Corporation, East Pittsburgh, Pa., a corporation of Pennsylvania Application June 21, 1954, Serial No. 438,145

7 Claims. (Cl. 187—29)

My invention relates to motor control circuits and more particularly to elevator motor control circuits utilizing both synchronously driven and non-synchronously driven control mechanisms interconnected through a lost motion coupling.

In U. S. Patent No. 2,657,765 granted to Conwell Savage on November 3, 1953, there is described a floor selector for an elevator system wherein a pair of sliding carriage assemblies simulate the motion of the elevator car. Each assembly comprises a synchronous carriage unit the movement of which is exactly synchronized to that of the elevator car, and an advance carriage unit connected to the synchronous carriage through a lost-motion coupling and adapted to lead the synchronous carriage to the limit of the lost-motion coupling. The purpose of the advance carriage is to actuate certain control relays, such as those operating floor indicating lights ahead of the motion of the elevator car.

The motor that drives the advance carriage preferably has a drooping speed-torque characteristic so as not to exert excessive force on the synchronous motor after the limit of the lost motion coupling has been reached. In the past, this drooping speed torque characteristic has been achieved solely by inserting resistances in series with the armature of the advance motor. It has been found through experience that a speed-torque characteristic having more droop than can be obtained by this expedient is necessary to insure that the synchronous motor (which is connected in a self-synchronous drive to a synchronous generator actuated by the elevator drive mechanism) will not pull out of synchronism with its associated generator.

Briefly, in my invention the field-flux of the advance motor is reduced as an inverse function of the armature current of the synchronous motor driving the synchronous carriage. Since the A. C. current in the three-phase winding of a self-synchronous receiver (motor) is proportional to the torque being transmitted thereby, an increase in this current is an indication that the advance motor is trying to drive the self-synchronous receiver out of step with its associated generator. Reduction of the field of the advance motor as the synchronous motor current increases will tend to increase the armature current in the advance motor. The resistance in series with the armature winding of the advance motor is thereupon effective to drop the voltage across the winding and thereby to bring about reduction in the torque of the advance motor that will counteract the tendency of the advance motor to drive the synchronous motor out of step with its generator.

An object of my invention is to provide a system for reducing the torque produced by a motor in accordance with the load placed upon a second motor.

Another object is to provide a system for reducing the torque of a motor below that which can be brought about by series resistance elements in the armature thereof.

A further object is to provide a system for keeping a synchronous motor in step with an associated generator in a synchronous-drive system when a second motor coupled to a common load tends to exert excessive force on the synchronous motor such as will tend to pull it out of synchronism with the generator.

Other objects and features of my invention will become evident upon consideration of the following detailed description when taken in connection with the accompanying drawings, in which.

Figure 1:
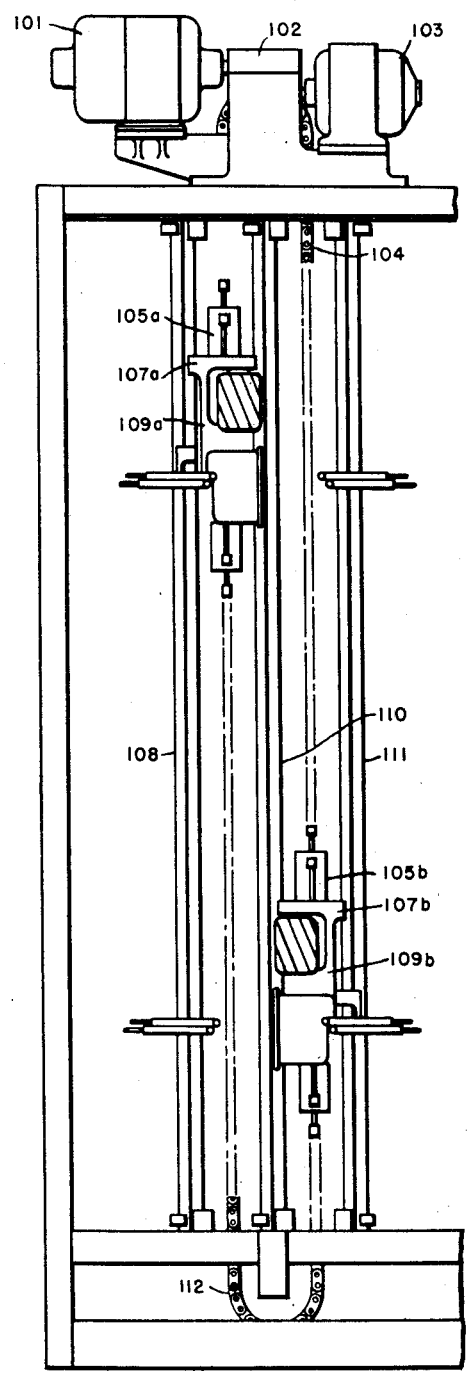
Figs. 1 and 2 are respectively a view in side elevation of an elevator floor selector and a view in front elevation of a carriage unit incorporated in the elevator floor selector, which views are advantageous in the understanding of my invention.

The elevator control mechanism shown in Fig. 1 is essentially the same as that described in the aforementioned Savage Patent No. 2,657,765. Therein is depicted a synchronous motor 101 which is part of a self-synchronous drive system, the generator of which is not shown. This synchronous motor and an asynchronous advance motor 103 drive a pair of carriage assemblies 109a and 109b through chain drives generally depicted by reference numerals 104 and 112. Carriage assembly 109a is composed of advance carriage unit 107a driven by advance motor 103, and synchronous carriage unit 105a driven by synchronous motor 101; likewise carriage assembly 109b is comprised of similarly driven advance carriage unit 107b and synchronous carriage unit 105b. The units of carriage assembly 109a are guided in linear paths by guide rails 108 and 110, while the units of carriage assembly 109b are similarly guided by guide rails 110 and 111. Carriage assembly 109a actuates switches that control the elevator car while it is moving in an upward direction, while assembly 109b similarly controls the elevator car when it is moving downward.

Figure 2:
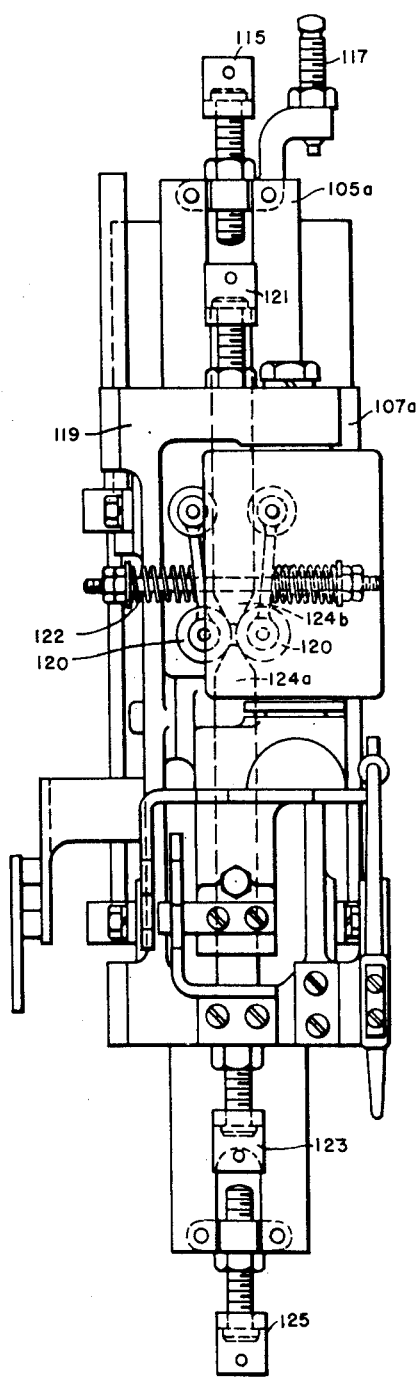

Synchronous motor 101 drives the carriage units 105a while advance motor 103 drives carriage units 107a and 107b as has been indicated above. The chain drive for the advance carriage is coupled thereto by adjustable sockets 115 and 125 (Fig. 2). Likewise, the chain drive from the advance motor is coupled to the advance carriage unit by adjustable sockets 121 and 123. The relative movement between the carriage assemblies is limited by means of an adjustable screw 117 mechanically connected to synchronous carriage 105a, which screw 117 engages the body 119 of advance carriage 107a. When a stop is made by the elevator car, the synchronous carriage unit and the advance carriage unit are brought into the same relative positions with respect to each other by means of releasable-latch assembly including springs 122 and detent rollers 120 connected to advance carriage 107a and a notch formed by members 124a and 124b of synchronous carriage 105a. The lost motion in the coupling is defined by the relative positions of the carriage unit when they are joined by the releasable-latch assembly and when screw 117 engages body 119 of the advance carriage unit.

For a more detailed description of the assembly and operation of the elevator control mechanism, reference is made to the aforementioned Savage patent.

Figure 3:
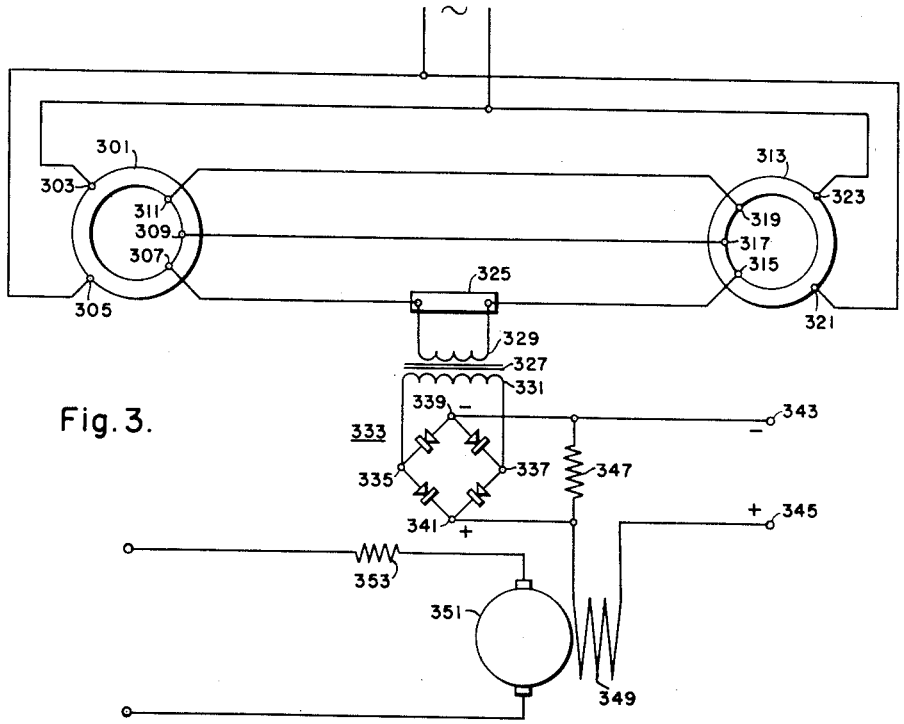
Figs. 3 and 4 are circuit diagrams of two embodiments of my invention.

With reference now to Fig. 3, there is shown one embodiment of my invention wherein a synchronous generator 301 and a synchronous motor 313 are interconnected in a self-synchronous drive system. Synchronous motor 313 corresponds to motor 101 of Fig. 1. Single-phase terminals 303 and 305 of generator 301 are respectively connected to single-phase terminals 323 and 321 of motor 313. The single-phase terminals are connected to a source of single-phase alternating current (not shown). Likewise, three-phase terminals 307, 309, and 311 of generator 301 are respectively connected to three-phase terminals 315, 317, and 319 of motor 313.

Advance motor 351, which may be an A.-C. induction motor of conventional design, has a separately excited field winding 349 supplied from a D.-C. source (not shown) having positive terminals 345 and negative terminals 343. The field winding is connected across terminals 343, 345 in series with variable resistor 347.

Inserted in the line between terminals 307 and 315 is a resistor 325 which preferably is non-inductive and has a very low resistance (not exceeding a few ohms). The terminals of resistor 325 are connected to the primary 329 of step-up transformer 327. The secondary 331 of transformer 327 is connected across the input terminals 335 and 337 of full-wave rectifier circuit 333, the output terminals 339 and 341 of which are connected across resistor 347.

Terminals 345 and 341 are respectively positive with respect to terminals 343 and 339 so that the voltage across variable resistor 347 is in opposition to the voltage across terminals 345 and 343, so that an increase in the magnitude thereof will thereby decrease the voltage across field winding 349. The resistance values of resistors 325 and 347 are chosen so that the output voltage of rectifier 333 is less than the voltage drop across resistor 347 when the motors are driving their respective carriage units within the limit of the lost motion coupling.

Advance motor 351, has inserted in series with the armature thereof resistor 353. The resistance value of resistor 353 should be such as to provide a substantial droop in the speed-torque characteristic without reference to the other circuitry described above. If a three-phase motor is utilized, resistances should be inserted in series with each of the phase-windings thereof.

Let it first be assumed that the motors 313 and 351 are in operation so as to drive the carriage assemblies described with reference to Figs. 1 and 2. The current through resistor 325 will be indicative of the load upon motor 313. While advance motor 351 is driving the advance carriage within the limits of the lost motion coupling, motor 313 will have a low armature current, the voltage drop across resistance 325 will be very low, and the output voltage of rectifier 333 will be insufficient to decrease the field current of motor 351. Upon driving the advance carriage to the limit of the lost motion coupling, advance motor 351 will thereafter tend to drive the synchronous carriages ahead of their synchronous positions. This will increase the torque on the synchronous motor 313 which will be reflected as an increase in the current through resistor 325, and an increased voltage between bridge rectifier output terminals 341 and 339. When this output voltage exceeds the normal voltage drop across resistor 347, the voltage drop across field winding 349 and the current therethrough will be lowered. Decrease in the field current of motor 351 will naturally tend to increase the armature current thereof; however, increase in armature current will likewise increase the voltage drop across resistor 353 and reduce the voltage across the armature of advance motor 351. Consequently, the torque produced by motor 351 will be substantially reduced. Reduction in the output torque of motor 351 will lessen the load upon motor 313 and counteract thte tendency of motor 351 to drive motor 313 out of step with generator 301.

Figure 4:
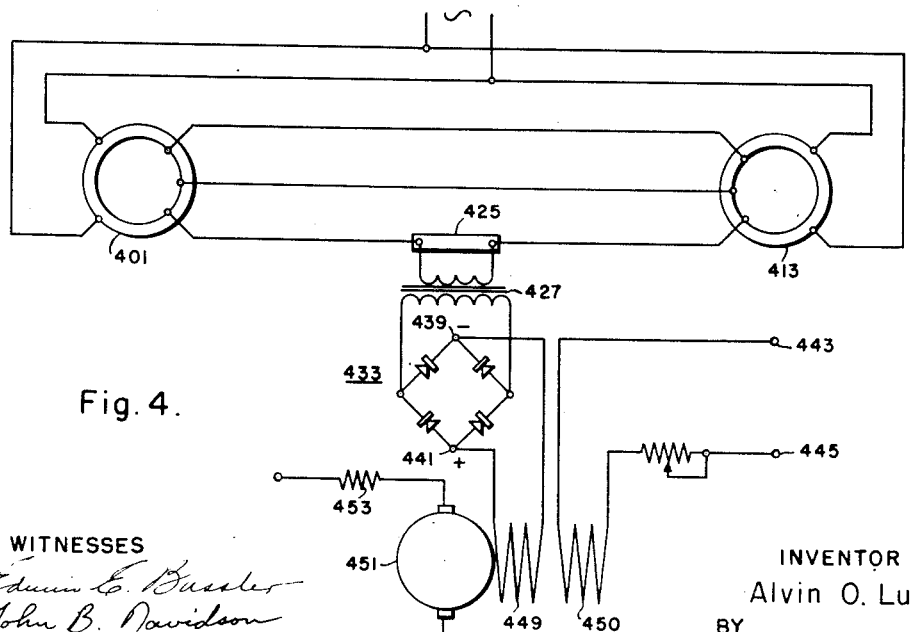

In the embodiments of my invention depicted in Figs. 3 and 4, reference numerals wherein the last two digits correspond represent identical circuit elements. In Fig. 4, synchronous generator 401 and synchronous motor 413 are interconnected in the same manner as in Fig. 3. Similarly, resistor 425 is inserted in one of the three-phase lines between the synchronous motor and generator, and is coupled to bridge rectifier 433 by means of step-up transformer 427. The output terminals of bridge rectifier 433, however, are coupled to a differential field winding 449, whereas field supply terminals 443 and 445 are connected to a main field winding 450. The field windings are wound so that an increase in the output of bridge circuit 433 will decrease the net field flux of motor 451. Resistance elements 453 are inserted in the armature circuit of motor 451 in the same manner as described with reference to Fig. 3.

In operation, an increase in the torque exerted on motor 413 by advance motor 451 will be reflected by an increase in current through resistor 425 and an increase in the output current of rectifier 433. The decrease in the net field motor 451 brought about thereby will again increase the armature current and decrease the armature voltage thereof. The torque on synchronous motor 413 will thereby be decreased so as to preclude the synchronous motor being driven out of step with its associated generator.

Following the teachings of my invention, there has been produced a system for keeping a synchronous motor in step with its associated generator in a self-synchronous drive system in spite of attempts by a second motor to exert excessive torque thereon through a common load.

Since numerous changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. In an elevator control circuit including a self-synchronous generator and a self-synchronous motor having polyphase windings connected together in a local circuit, a synchronous carriage driven by said synchronous motor, a lead carriage mechanically connected to said synchronous carriage through a lost motion coupling, and a lead motor connected to said lead carriage and adapted to drive said lead carriage in advance of said synchronous carriage within the limits of said lost motion coupling, said lead motor having at least one field winding means thereon; a resistance means in series with the armature of said lead motor, low impedance means in series with at least one of the polyphase windings of said self-synchronous motor, rectifier means coupled to said low impedance means adapted to derive a first direct voltage proportional to the armature current of said self-synchronous motor, means coupled to said field winding of said lead motor adapted to decrease the magnetic field of said lead motor in accordance with the magnitude of said direct voltage, thereby increasing the armature current and decreasing the armature voltage and effective torque thereof.

2. In an elevator control circuit including a self-synchronous generator and a self-synchronous motor having polyphase windings connected together in a local circuit, a synchronous carriage driven by said synchronous motor, a lead carriage mechanically connected to said synchronous carriage through a lost motion coupling, and a lead motor connected to said lead carriage and adapted to drive said lead carriage in advance of said synchronous carriage within the limits of said lost motion coupling, said lead motor having at least one field winding means thereon; a resistance means in series with the armature of said lead motor, low impedance means in series with at least one of the polyphase windings of said self-synchronous motor, rectifier means coupled to said low impedance means adapted to derive a first direct voltage proportional to the armature current of said self-synchronous motor winding, direct voltage supply means coupled to said field winding of said lead motor by means of second resistance means, said first direct voltage being coupled across said second resistance means to decrease the voltage across said field winding of said lead motor.

3. In a motor control circuit including a first motor, a first mechanism driven by said first motor according to a predetermined path, a second motion having field winding means thereon, and a second mechanism driven by said second motor and connected to said first mechanism through a lost motion coupling; first means coupled to the armature circuit of said first motor adapted to derive an output voltage proportional to the armature current of said first motor; second means including means coupling to the output of said first means and to said field winding means of said second motor adapted to reduce the torque of said second motor as a function of said output voltage.

4. In a motor control circuit including a first motor, a first mechanism driven by said first motor according to a predetermined path, a second motor having field winding means thereon, and a second mechanism driven by said second motor and connected to said first mechanism through a lost motion coupling; first means coupled to the armature circuit of said first motor adapted to derive an output voltage proportional to the armature current of said first motor; field current supply means for said second motor coupled to said first means and adapted to vary the torque produced by said second motor as an inverse function of the armature current of said first motor.

5. In a motor control circuit including a self-synchronous motor, a first mechanism driven by said motor, an advance motor having field winding means, first impedance means in the armature circuit of said advance motor, a second mechanism driven by said advance motor connected to said first mechanism by a lost motion coupling so as to lead said first mechanism by not more than a given distance; second impedance means connected in the armature circuit of said self-synchronous motor, first means coupled across said second impedance means adapted to derive a direct voltage proportional to the armature current of said synchronous motor, said first means being coupled to said field winding means and adapted to decrease the magnetic field of said advance motor as a function of said direct voltage.

6. In a motor control circuit including a self-synchronous motor, a first mechanism driven by said motor, an advance motor having field winding means thereon, a second mechanism driven by said advance motor connected to said first mechanism by a lost motion coupling so as to lead said first mechanism by not more than a given distance; impedance means connected in the armature circuit of said self-synchronous motor, first means coupled across said impedance means adapted to derive a direct voltage proportional to the armature current of said synchronous motor, means coupled to said first means adapted to decrease the field excitation of said advance motor with increase in the magnitude of said direct voltage, and impedance means in the armature circuit of said advance motor.

7. In a motor control circuit including a first motor, a first mechanism driven by said first motor according to a predetermined path, a second motor having field winding means thereon, and a second mechanism driven by said second motor and connected to said first mechanism through a lost motion coupling; means including field current supply means for said second motor coupled to the armature circuit of said first motor to respond to the armature curernt thereof and adapted to vary the torque produced by said second motor as an inverse function of the armature current of said first motor.

No references cited.